United States Patent [19]

Salyer

[11] Patent Number: 5,236,289

[45] Date of Patent: Aug. 17, 1993

[54] SHIELDED UNIVERSAL JOINT, JOINTED TOOL AND GUIDED SURGICAL DRILL

[75] Inventor: Paul E. Salyer, Warsaw, Ind.

[73] Assignee: Othy, Inc., Warsaw, Ind.

[21] Appl. No.: 667,180

[22] Filed: Mar. 11, 1991

[51] Int. Cl.⁵ .............................................. B23B 45/00
[52] U.S. Cl. ................... 408/127; 81/177.75; 279/16; 403/57; 403/123; 408/72 B; 606/80
[58] Field of Search ............... 81/177.7, 177.75; 403/57, 74, 114, 123; 400/127, 72 R; 606/80; 279/16; 408/72 B, 115 B, 97, 120, 123

[56] References Cited

U.S. PATENT DOCUMENTS

| | | | |
|---|---|---|---|
| 788,766 | 5/1905 | French | 408/120 |
| 1,506,331 | 8/1924 | Benko | 279/16 |
| 2,381,102 | 8/1945 | Boyd | 279/16 |
| 2,503,373 | 4/1950 | Browning et al. | 81/177.7 |
| 2,521,816 | 9/1950 | Adams | 408/120 |
| 2,552,147 | 5/1951 | Browning | 81/177.7 X |
| 2,687,024 | 8/1954 | George | 403/123 X |
| 3,173,700 | 3/1965 | Klukos | 279/16 |
| 3,196,463 | 7/1965 | Farneth | 403/114 X |
| 3,364,510 | 1/1968 | Johnson | 408/123 |
| 3,855,884 | 12/1974 | McPeak | 81/177.75 |
| 4,799,832 | 1/1989 | Abbott | 408/120 |
| 4,833,950 | 5/1989 | Moncada | 403/57 |
| 4,856,946 | 8/1989 | Park | 408/123 |
| 4,936,701 | 6/1990 | Allen et al. | 81/177.75 X |
| 4,984,942 | 1/1991 | Holtz | 279/16 |

FOREIGN PATENT DOCUMENTS

| | | | |
|---|---|---|---|
| 2651168 | 5/1978 | Fed. Rep. of Germany | 81/177.75 |
| 2745384 | 5/1979 | Fed. Rep. of Germany | 81/177.75 |
| 638716 | 6/1928 | France | 403/123 |
| 912736 | 8/1946 | France | 408/72 |

Primary Examiner—Daniel W. Howell
Attorney, Agent, or Firm—Lundy & Associates

[57] ABSTRACT

A shielded universal joint having a pivot head defining a primary axis. The pivot head has a ball and a neck. The ball has a longitudinal slot. The slot has a throat at the center of the ball. The imperfect socket head is provided having a socket and a pin. The socket defines a secondary axis. The socket has a cavity concentric with the secondary axis. The cavity closely receives the ball. The socket has a continuous margin. The pin is joined to the socket in spaced relation to the margin. The pin extends through the passage. The pin defines a first pivot axis extending longitudinally through the pin. The pin and the throat define a second pivot axis extending through the throat and the pin perpendicularly to the first pivot axis. The socket head is simultaneously pivotal relative to the ball about both of the pivot axes.

21 Claims, 3 Drawing Sheets

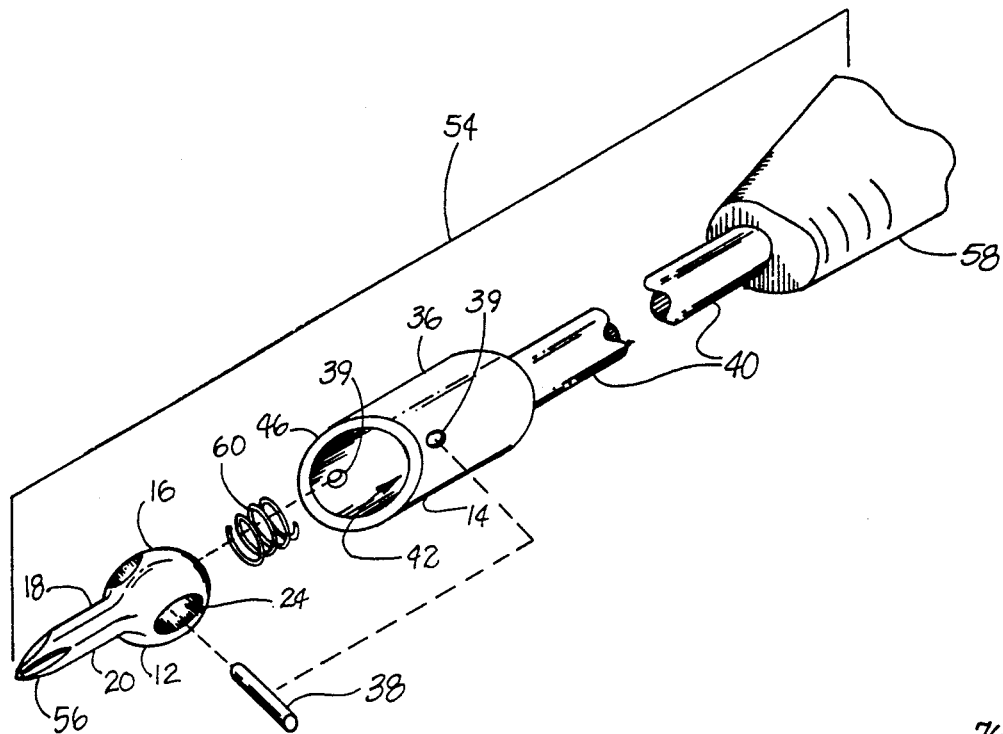
FIG. 4
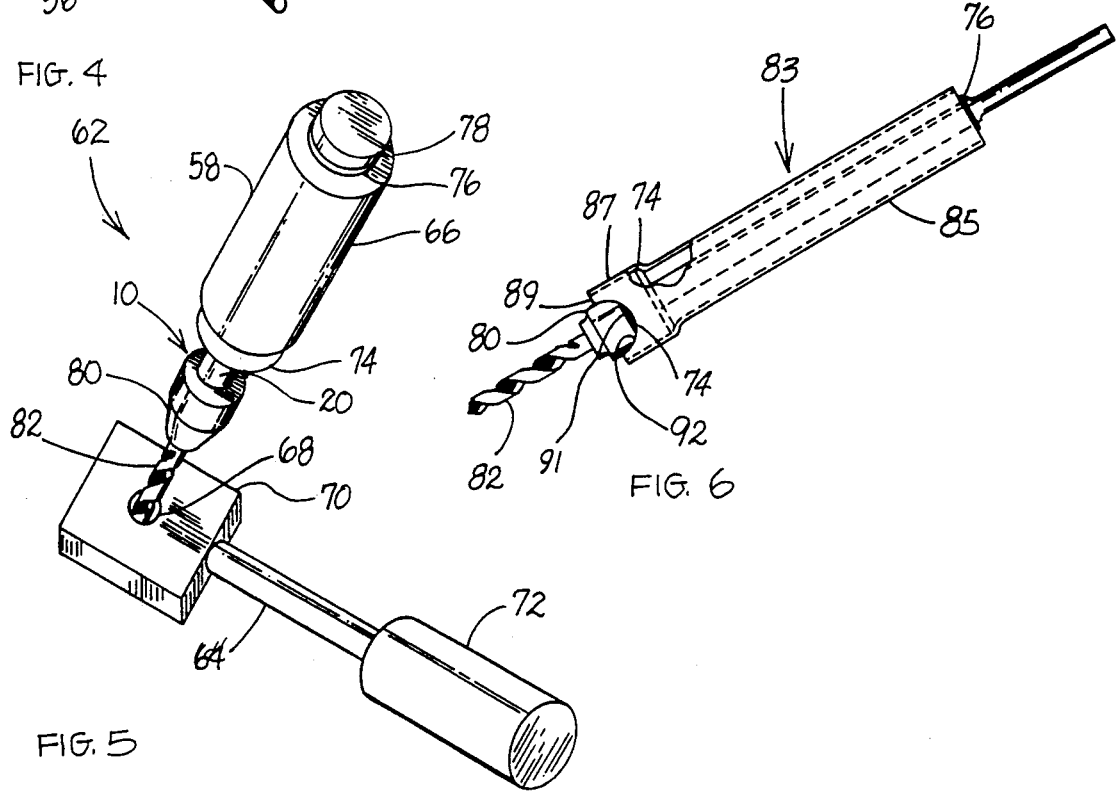
FIG. 5
FIG. 6

SHIELDED UNIVERSAL JOINT, JOINTED TOOL AND GUIDED SURGICAL DRILL

BACKGROUND OF THE INVENTION

The present invention pertains to universal joints and more particularly pertains to shielded universal joints, jointed tools and guided surgical drills.

Universal joints are available for use with hand tools such as portable drills in situations in which space constraints preclude ordinary use of the tool. Commonly, these universal joints utilize two forks pinned at right angles to an intermediate block or a flexible coupling. Neither of these universal joints is optimal for use in a surgical setting, since both joints are easily clogged with debris. The universal joint utilizing a pinned block, either has close tolerances and is difficult to clean or has wide tolerances and tends to be difficult to use because of excessive slop. The flexible coupling joint is difficult to clean and is limited as to angles of use.

It is therefore highly desirable to provide an improved universal joint, an improved jointed tool and an improved guided surgical drill all of which are shielded.

It is also highly desirable to provide an improved universal joint, an improved jointed tool and an improved guided surgical drill in which the shielded universal joint is shielded and substantially protected from debris.

It is also highly desirable to provide an improved universal joint, an improved jointed tool and an improved guided surgical drill which has a smooth operation, irrespective of the angle of operation.

It is also highly desirable to provide an improved universal joint, an improved jointed tool and an improved guided surgical drill which has only a single pivot pin, and a minimum of parts.

It is also highly desirable to provide an improved universal joint, an improved jointed tool and an improved guided surgical drill which has a mechanically simple construction which can be manufactured inexpensively.

It is also highly desirable to provide an improved universal joint, an improved jointed tool and an improved guided surgical drill, in which the shielded universal joint is relatively easy to clean for surgical use.

It is finally highly desirable to provide an improved universal joint, an improved jointed tool and an improved guided surgical drill, which meets all of the above desired features.

SUMMARY OF THE INVENTION

It is an object of the invention to provide an improved universal joint, an improved jointed tool and an improved guided surgical drill all of which are shielded.

It is another object of the invention to provide an improved universal joint, an improved jointed cool and an improved guided surgical drill in which the shielded universal joint is shielded and substantially protected from debris.

It is another object of the invention to provide an improved universal joint, an improved jointed tool and an improved guided surgical drill which has a smooth operation, irrespective of the angle of operation.

It is another object of the invention to provide an improved universal joint, an improved jointed tool and an improved guided surgical drill which has only a single pivot pin, and a minimum of parts.

It is another object of the invention to provide an improved universal joint, an improved jointed tool and an improved guided surgical drill which has a mechanically simple construction which can be manufactured inexpensively.

It is another object of the invention to provide an improved universal joint, an improved jointed tool and an improved guided surgical drill in which the shielded universal joint is relatively easy to clean for surgical use.

It is finally an object of the invention to provide an improved universal joint, an improved jointed tool and an improved guided surgical drill which provides all of the above objects.

In the broader aspects of the invention there is provided a shielded universal joint having a pivot head defining a primary axis. The pivot head has a ball and a neck. The ball has a longitudinal slot. The slot has a throat at the center of the ball. The imperfect socket head is provided having a socket and a pin. The socket defines a secondary axis. The socket has a cavity concentric with the secondary axis. The cavity closely receives the ball. The socket has a continuous margin. The pin is joined to the socket in spaced relation to the margin. The pin extends through the passage. The pin defines a first pivot axis extending longitudinally through the pin. The pin and the throat define a second pivot axis extending through the throat and the pin perpendicularly to the first pivot axis. The socket head is simultaneously pivotal relative to the ball about both of the pivot axes.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 4 is an exploded view of an embodiment of the jointed tool of the invention.

FIG. 5 is a perspective view of an embodiment of the guided surgical drill of the invention.

FIG. 6 shows an embodiment of the drill having a free spinning grip.

DESCRIPTION OF A SPECIFIC EMBODIMENT

Figure 1:
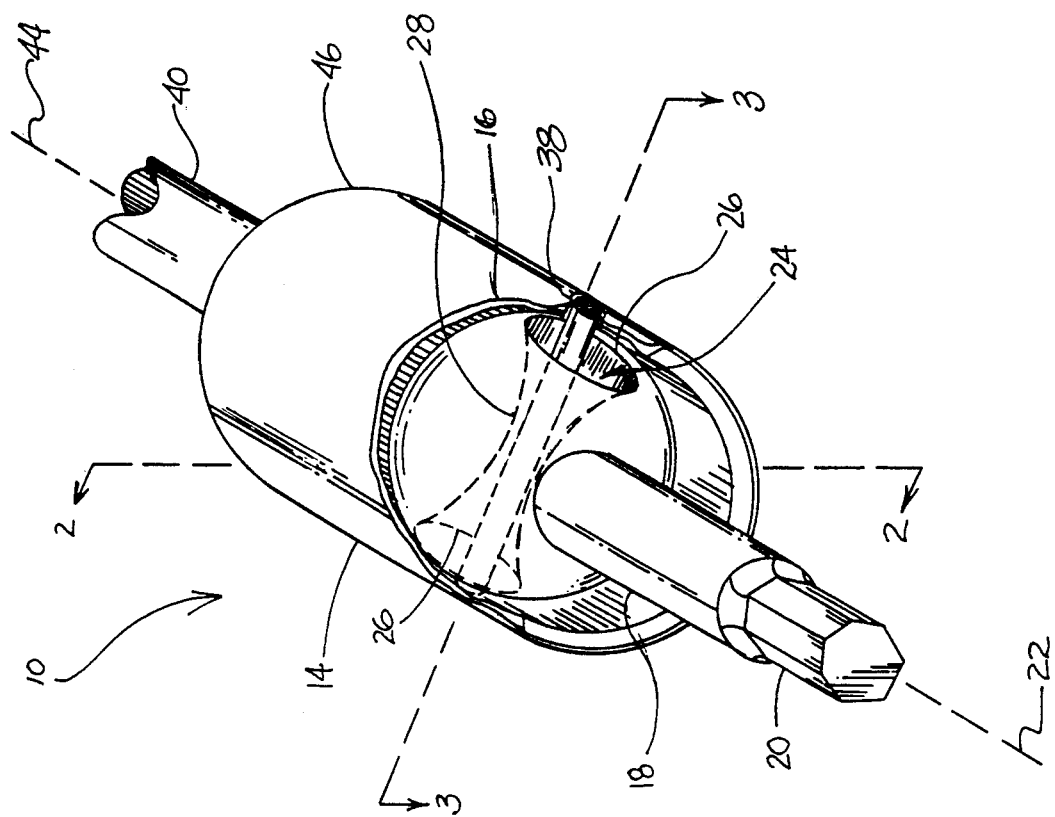
FIG. 1 is a cut-away perspective view of an embodiment of the shielded universal joint of the invention.
Figure 2:
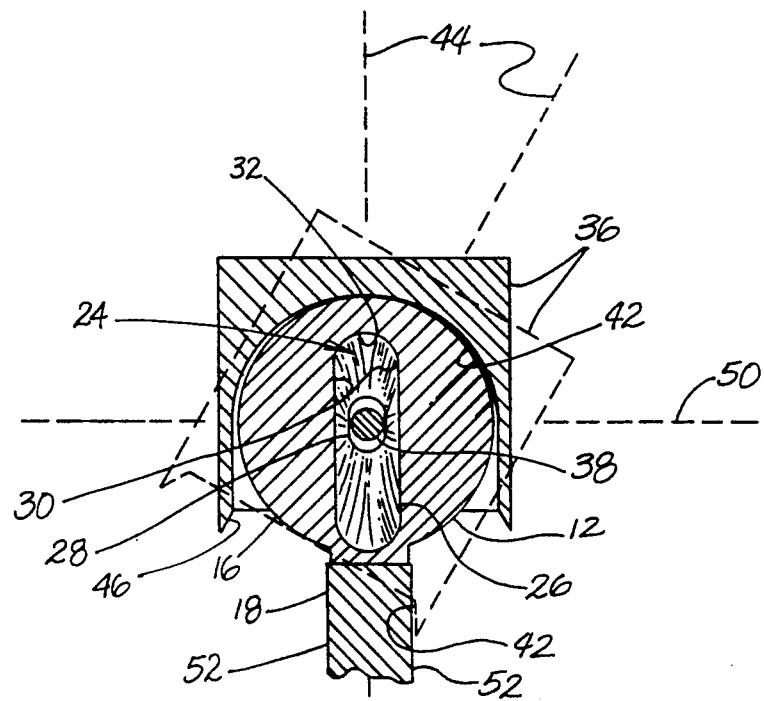
FIG. 2 is a partial semi-diagrammatical cross-sectional view of the shielded universal joint of FIG. 1 taken substantially along section line 2—2 of FIG. 1. The socket head is shown in solid lines in an unpivoted position and in dashed lines pivoted solely about a first pivot axis.
Figure 3:
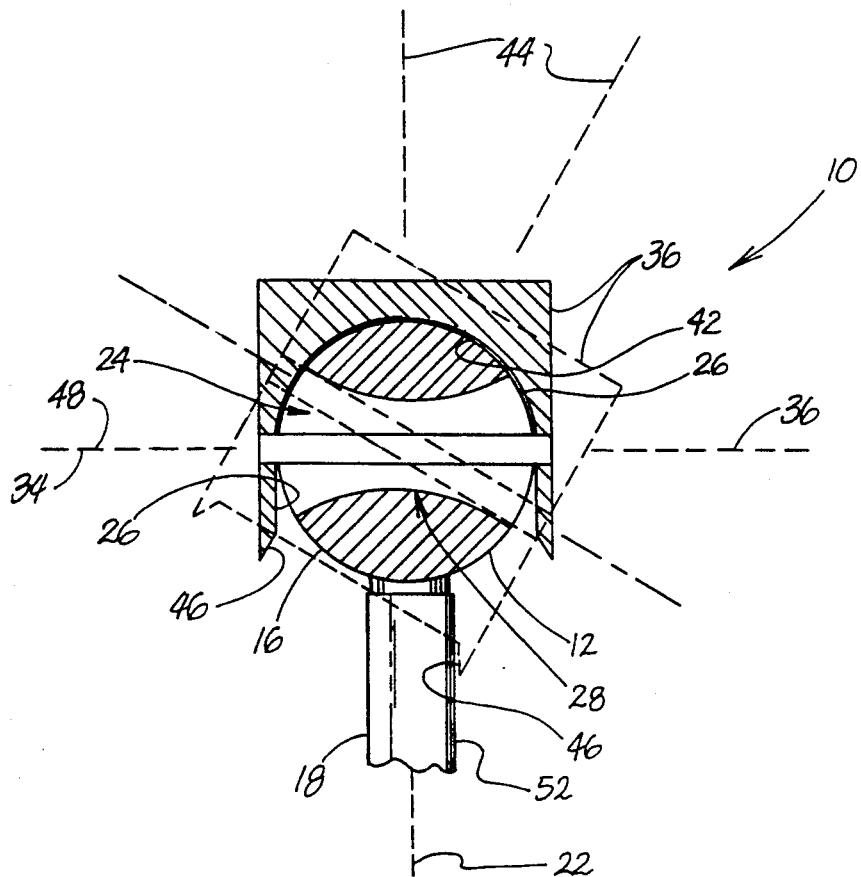
FIG. 3 is a partial semi-diagrammatical cross-sectional view of the shielded universal joint of FIG. 1 taken substantially along section 3-3 of FIG. 1. The socket head is shown in solid lines in an unpivoted position and in dashed lines pivoted solely about a second pivot axis.

Referring now to FIGS. 1-3, the shielded universal joint 10 of the invention has a pivot head 12 and a socket head 14. Pivot head 12 includes a ball 16, a neck 18 and a working arm 20 which is joined to ball 16 and is continuous with both pivot working arm 20 and ball 16. Ball 16 in particular embodiments is substantially spherical, or is flattened or lengthened where ball 16 adjoins neck 18 and at the opposite pole. Neck 18 is generally cylindrical and smaller in diameter than ball 16 and neck 18. Neck 18 defines a longitudinal primary or ball axis 22, which extends through the center of ball 16. Working arm 20 is aligned on ball axis 22. The shape and length of working arm 20 depends on the end use of joint 10.

Ball 16 has a longitudinal passage or slot 24, which extends through ball 16 transverse to primary axis 22. Passage 24 may extend beyond ball 16 into neck 18 in a particular embodiment. Passage 24 has a pair of opposed openings 26 on the surface of ball 16 and a throat or constriction 28 adjacent the geometric center of ball 16.

Openings 26 each have a longer dimension in a direction parallel to primary axis 22 and a shorter dimension in a direction perpendicular to primary axis 22. In a particular embodiment of the invention, openings 26 are oval in shape and the longer and shorter dimensions represent long and short axes of the oval.

Throat 28 is smaller than openings 26 in cross-sections parallel to primary axis 22. Throat 28 is the same size or smaller than openings 26 in cross-sections perpendicular to primary axis 22 and parallel to the shorter dimension of openings 26. In a particular embodiment of the invention, passage 24 has the shape of two laterally flattened funnels, joined together at their apexes. Each funnel has flat, longitudinally disposed sides 30, joined by curved ends 32, all sloped inwardly to an oval shaped throat 28. In a particular embodiment of the invention, center line 34 of the funnels is perpendicular to primary axis 22 and curved ends 32 extend approximately 45 degrees forward of and approximately 45 degrees to the rear of center line 34.

Socket head 14 is imperforate and includes a socket 36 and a pin 38. Socket 36 is continuous with a socket working arm 40. Socket 36 has a cup-shaped cavity 42, which is occupied by ball 16. Socket 36 defines a secondary or socket axis 44, which extends through the center of cavity 42 and the geometric center of ball 16 positioned therein. Working arm 40 is aligned on axis 44. Socket 36 has an annular margin 46 adjoining cavity 42. In a particular embodiment of the invention, margin 46 is recessed or chamfered. In a particular embodiment of the invention, cavity 42 substantially has the shape of a hemisphere or a smaller portion of a sphere and closely receives ball 16.

Pin 38 is generally cylinderical and extends across cavity 42 and through passage 24, and generally perpendicularly to secondary axis 44. Openings 26 and throat 28 of passage 24 loosely receive pin 38. Pin 38 has a diameter sized to permit free movement in a longitudinal direction along openings 26 and to substantially preclude movement in a direction perpendicular to the longest dimension of openings 26.

Socket 36 is retained on ball 16 only by pin 38. Pin 38 is separated from margin 46 by a distance, which is preferably generally equal to the radius of ball 16. Pin 38 is sized so as to fit within socket 36 without any gaps or other hard to clean spaces. In a particular embodiment of the invention, pin 38 is press fit within apertures 39 and pin 38 is fixed in rigid relation to socket 36.

Pin 38 defines a first pivot axis 48 extending longitudinally through pin 38 and perpendicular to secondary axis 44. Passage 24 defines a second pivot axis 50, which extends perpendicular to center line 34 of passage 24. Pin 38 and socket 36 are simultaneously pivotable relative to ball 16 about the two, substantially orthogonal, pivot axes 48, 50. Second pivot axis 50 extends through pin 38, and second pivot axis 50 remains substantially perpendicular to first pivot axis 48 during that pivoting. In a particular embodiment of the invention in which center line 34 is perpendicular to primary axis 22 and curved ends 32 are each angled outward by 45 degrees, socket head 14 is pivotable about each pivot axis 48, 50 through about 90 degrees.

The pivoting of pin 38 about both first pivot axis 48 and second pivot axis 50 is limited by the engagement of margin 46 and neck 18. Margin 46 is continuous and neck 18 has a continuous contact region 52 and socket head 14 is endlessly pivotable with margin 46 in engagement with neck 18.

In a particular embodiment of the invention, throat 28 is oval in shape and has its longest dimension parallel to primary axis 22. In that embodiment of the invention, pin 38 is movable within passage 24, forward and back, in directions parallel to primary axis 22, but pin 38 is not substantially movable in directions transverse to primary axis 22. This feature provides ease of cleaning without significantly effecting the functioning of shielded universal joint 10.

Referring now to FIGS. 4-5, a jointed tool 54 of the invention having the shielded universal joint 10 of the invention is shown to have a work head 56 at the free end of working arm 20 and a grip or connector 58 at the free end of working arm 40. Work head 56 may be on either working arm 20, 40, however, placement of work head 56 on pivot working arm 20 reverses the orientation of socket 36 and mitigates against uses likely to produce clogging debris. Thus, in particular embodiments, work head 56 is usually placed on working arm 20 for hand tools, as shown in FIG. 4, and work head 56 is usually placed on working head 40 for power tools as shown in FIG. 5.

FIG. 4 illustrates an embodiment of jointed tool 54 in which pivot working arm 20 includes a screwdriver work head 56 and socket working arm 40 includes a grip 58. In that embodiment of jointed tool 54, shielded universal joint 10 includes a compression spring or other resilient element 60, disposed between ball 16 and socket 36. The effect of spring 60 is to bias pivot head 12 in a direction outwardly of socket 36, against pin 38. Spring 60 opposes rotation of ball 16 and forward and back movement of ball 16 within passage 24. Spring 60 may be selected to offset the effect of gravity 42 on the work head 56, permitting the user to present the orientation of the work head 56 before engaging a screw or other workpiece.

Referring now to FIG. 5, a guided surgical drill 62 of the invention is shown to have a drill guide 64 and drill tool 66. Drill guide 64 has a bushing 68 mounted in a holder 70, which includes a handle 72. Bushing 68 may be sized for a standard drill bit and may be interchangeable. Drill tool 70 includes shielded universal joint 10. Pivot working arm 20 has a collar 74, which extends outward from neck 18 behind contact region 52. Behind collar 74 is a free-spinning grip 58, which is held in place by a stop 76, such as a snap ring. To the rear of stop 76 is a shank 78, which can be retained by the chuck of a portable drill (not shown) or the like. On working arm 40 is an arbor 80 for a drill bit 82, threaded in a direction opposite to the direction of rotation of the portable drill.

Referring now to FIG. 6, the guided surgical drill 62 of the invention is shown to have a free spinning grip 83 which has a handle portion 85 and a shield portion 87.

Grip 83 is held in place between collar 74 and stop 76. Grip portion 85 is essentially the same as grip 58. Shield portion 87, however, is formed integrally with grip portion 85 and extends over collar 74 and over arbor 80. Shield portion 87 extends over the entire axial length of arbor 80 in close proximity to arbor 80 thereby restricting flow of any contaminating material between arbor 80 and shield portion 87 or into the socket 36 of the universal joint 10 which faces toward handle portion 85. Shield portion 87, however, limits the movement of arbor 80 by its contact with its distal peripheral edge 89 to an angular displacement from axis 44 which is less than that above described with reference to limitation afforded by contact between pin 38 and margin 46. To accomodate the same angular movement as limited by contact between pin 38 and margin 46, cut-out 91 is provided in shield portion 87. Cut-out 91 has a radius peripheral edge 92 which closely approximates the exterior radius of arbor 80 so as to restrict debris from passing between arbor 80 and shield portion 87. In this manner, drill bit 82 may be angled with reference to axis 44 at the full angle allowed by margin 46 in one radial positioned of shield portion 87 and yet still be shielded from the entry of debris into the universal joint 10 in a major way.

In operation, shielded universal joint 10 and jointed tool 54 and guided surgical drill 62 are used by rotating one of the working arms 20, 40 about its respective primary or secondary axis 22, 44, respectively, while at the same time limiting movement of the other working arm 40, 20 to rotation about its respective primary or secondary axis 44, 22, respectively. With, for example, the screwdriver-headed jointed tool 54, the limitation of movement is provided by engagement with the screw. With the guided surgical drill 62, the limitation of movement is provided by the drill guide 64. With the shielded universal joint 10 in socketforward orientation, debris produced by the work head 56, such as bone chips and other surgical debris in the case of the guided surgical drill 62, are generally excluded from the shielded universal joint 10 by the imperforate socket head 14.

The improved universal joint of the invention provides a shielded universal joint, improved jointed tool and an improved guided surgical drill in which the universal joint is substantially protected from debris and relatively easily cleaned for surgical use.

While a specific embodiment of the invention has been shown and described herein for purposes of illustration, the protection afforded by any patent which may issue upon this application is not strictly limited to the disclosed embodiment; but rather extends to all structures and arrangement which fall fairly within the scope of the claims which are appended hereto:

What is claimed is:

1. A shielded universal joint comprising a pivot head defining a primary axis, said pivot head having a ball and an elongated neck, said ball having a longitudinal slot extending therethrough, said slot having a throat at the center of said ball, and an imperforate socket head having a socket and an elongated rod, said socket head defining a secondary axis, said socket having a cavity concentric with said secondary axis, said cavity closely receiving said ball, said socket having a continuous margin, a pin joined to said socket in spaced relation to said margin, said pin extending through said slot, said pin defining a first pivot axis extending longitudinally through said pin, said pin and said slot defining a second pivot axis extending through said throat and said pin perpendicularly to said first pivot axis, said socket head being simultaneously and universally pivotable relative to said ball about both said pivot axes between opposite engagements of said neck and margin, a secondary shield rotatably mounted on said neck, said shield having an enlarged portion which overlays said socket head adjacent its distal end, said enlarged portion having a cut-out generally in the same size and shape as said socket head, said cut-out allowing said neck and margin to engage when said socket head is within said cut-out.

2. The shielded universal joint of claim 1 wherein said cavity is spherical.

3. The shielded universal joint of claim 1 wherein said margin without said secondary shield is endlessly pivotable in engagement with said neck and therebetween.

4. The shielded universal joint of claim 1 wherein said cavity is at one end of the elongated rod of said socket head, and further comprising a handle at the other end of said rod.

5. A guided cutting tool comprising a tool guide and a cutting tool, said tool guide including a bushing and a holder, said cutting tool including a pivot head defining a primary axis, said pivot head having a ball and a neck, said neck defining a primary axis, said ball having a longitudinal slot with a throat at the center of said ball, a pivot working arm extending out from said neck, said pivot working arm including a grip, an imperforate head having a socket therein and a pin, said socket defining a secondary axis, said socket having a cavity concentric with said secondary axis, said cavity closely receiving said ball, said socket having a continuous margin, said pin being joined to said socket in spaced relation to said margin, said pin extending through said passage, said pin defining a first pivot axis extending longitudinally through said pin, said pin and said throat defining a plurality of second pivot axes extending through said throat and said pin perpendicular to said first pivot axis, said socket head being simultaneously pivotable relative to said ball about said pivot axes, and a socket working arm extending out from said socket, said socket working arm including means for retaining a tool, said portion being enlarged, said enlarged portion having a cut-out generally in the same size and shape as said socket head, said cut-out allowing said neck and margin to engage when said socket head is within said cut-out.

6. The shielded universal joint of claim 1 wherein said neck has opposite ends, said ball is at one end of said elongated neck and a tool chuck is at the other end.

7. The shielded universal joint of claim 1 wherein said throat and pin form a bushing and pivot rod.

8. The guided cutting tool of claim 5 wherein said socket head being simultaneously and universally pivotable relative to said ball about both said pivot axes between opposite engagements of said neck and margin.

9. The shielded universal joint of claim 1 wherein the separation of said pin and said margin is about equal to the radius of said ball.

10. The shielded universal joint of claim 1 wherein said socket head is pivotable relative to said pivot head about said first pivot axis through an angle of about ninety degrees.

11. The shielded universal joint of claim 1 wherein in said socket head is pivotable relative to said pivot head about said second pivot axis through an angle of about ninety degrees.

12. The shielded universal joint of claim 1 wherein said socket head is pivotable relative to said pivot head about said first pivot axis through an angle of about ninety degrees and about said second pivot axis through an angle of about ninety degrees.

13. The guided cutting tool of claim 5 wherein said grip being rotatably mounted on said neck, said grip having a portion which overlays said socket head from its distal end to the junction between said socket and rod.

14. A shielded universal joint comprising a pivot head defining a primary axis, said pivot head having a ball and an elongated neck, said ball having a passage extending therethrough with a pair of opposed openings on the surface of said ball, and a centrally located throat between said openings, said openings each having a longer dimension in a direction parallel to said primary axis than said throat, and an imperforate socket head having a socket and a pin, said socket head defining a secondary axis, said socket head having a cavity therein concentric with said secondary axis, said cavity closely receiving said ball, said socket having a continuous margin, said pin being joined to said socket in spaced relation to said margin, said pin extending across said cavity and through said passage, said pin defining a first pivot axis perpendicular to said secondary axis, said socket head being simultaneously pivotable relative to said ball about said first pivot axis and about a plurality of second pivot axes transverse of said primary axis, a secondary shield rotatably mounted on said neck, said shield having an enlarged portion which overlays said socket head adjacent its distal end, said enlarged portion having a cut-out generally in the same size and shape as said socket head, said cut-out allowing said neck and margin to engage when said socket head is within said cut-out.

15. The shielded universal joint of claim 14 wherein said margin is movable into engagement with said neck in a plurality of positions.

16. A jointed tool comprising an imperforate socket head with a socket working arm defining a socket axis, said socket head having a socket and a pin, said socket having a cavity concentric with said socket axis, said socket having a continuous margin, said pin being joined to said socket in spaced relation to said margin, said pin extending across said cavity, said pin defining a first pivot axis perpendicular to said socket axis, said socket working arm extending out from said socket, a pivot head having a ball and a neck, said neck defining a ball axis, said ball being closely fit within said cavity, said ball having a passage therethrough receiving said pin, said passage having a pair of opposed openings on the surface of said ball and a centrally located throat, said openings each having a longer dimension in a direction parallel to said ball axis than said throat, said pin being simultaneously pivotable within said passage about said first pivot axis and about a plurality of second pivot axes perpendicular to said ball axis and transverse to said first pivot axis, and a pivot working arm extending out from said neck, one of said working arms having a work head at the distal end thereof, a secondary shield rotatably mounted on said neck, said shield having an enlarged portion which overlays said socket head adjacent its distal end, said enlarged portion having a cut-out generally in the same size and shape as said socket head, said cut-out allowing said neck and margin to engage when said socket head is within said cut-out.

17. The jointed tool of claim 16 further comprising a resilient member disposed between said ball and said socket, said resilient member biasing said pivot member against said pin.

18. A jointed hand tool comprising an imperforate socket head with a socket working arm defining a socket axis, said socket head having a socket and a pin, said socket having a cavity concentric with said socket axis, said socket having a continuous margin, said pin being joined to said socket in spaced relation to said margin, said pin extending across said cavity, said pin defining a first pivot axis perpendicular to said socket axis, said socket working arm extending out from said socket, a pivot head having a ball and a neck, said neck defining a ball axis, said ball being closely fit within said cavity, said ball having a passage therethrough receiving said pin, said passage having a pair of opposed openings on the surface of said ball and a centrally located throat, said openings each having a longer dimension in a direction parallel to said ball axis than said throat, said pin being simultaneously pivotable within said passage about said first pivot axis and about a plurality of second pivot axes perpendicular to said ball axis and transverse to said first pivot axis, and a pivot working arm extending out from said neck, said socket working arm having a tool at the distal end thereof, said neck of said pivot head having a machine shoe chuck receiving shank at the distal end thereof, a secondary shield rotatably mounted on said neck, said shield having an enlarged portion which overlays said socket head adjacent its distal end, said enlarged portion having a cut-out generally in the same size and shape as said socket head, said cut-out allowing said neck and margin to engage when said socket head is within said cut-out.

19. A jointed power tool comprising an imperforate socket head with a socket working arm defining a socket axis, said socket head having a socket and a pin, said socket having a cavity concentric with said socket axis, said socket having a continuous margin, said pin being joined to said socket in spaced relation to said margin, said pin extending across said cavity, said pin defining a first pivot axis perpendicular to said socket axis, said socket working arm extending out from said socket, a pivot head having a ball and a neck, said neck defining a ball axis, said ball being closely fit within said cavity, said ball having a passage therethrough receiving said pin, said passage having a pair of opposed openings on the surface of said ball and a centrally located throat, said openings each having a longer dimension in a direction parallel to said ball axis than said throat, said pin being simultaneously pivotable within said passage about said first pivot axis and about a plurality of second pivot axes perpendicular to said ball axis and transverse to said first pivot axis, and a pivot working arm extending out from said neck, said socket working arm having a handle at the distal end thereof, said pivot head neck having a tool at the distal end thereof, a secondary shield rotatably mounted on said neck, said shield having an enlarged portion which overlays said socket head adjacent its distal end, said enlarged portion having a cut-out generally in the same size and shape of said socket head, said cut-out allowing said neck and margin to engage when said socket head is within said cut-out.

20. A guided cutting tool comprising a drill guide and a drill tool, said drill guide including a bushing and a holder, said drill tool including a pivot head defining a primary axis, said pivot head having a ball and a neck, said neck defining a primary axis, said ball having a longitudinal slot with a throat at the center of said ball, a pivot working arm extending out from said neck, said pivot working arm including a grip, an imperforate socket head having a socket and a pin, said socket defining a secondary axis, said socket having a cavity concentric with said secondary axis, said cavity closely receiving said ball, said socket having a continuous margin, said pin being joined to said socket in spaced relation to said margin, said pin extending through said passage, said pin defining a first pivot axis extending longitudinally through said pin, said pin and said throat defining a plurality of second pivot axes extending through said throat and said pin perpendicular to said first pivot axis, said socket head being simultaneously pivotable relative to said ball about said pivot axes, and a socket working arm extending out from said socket, said socket working arm including means for retaining a drill bit corresponding in diameter to said bushing, a secondary shield rotatably mounted on said neck, said shield having an enlarged portion which overlays said socket head adjacent its distal end, said enlarged portion having a cut-out generally in the same size and shape of said socket head, said cut-out allowing said neck and margin to engage when said socket head is within said cut-out.

21. The cutting tool of claim 20 wherein pivoting of said pin about said pivot axes is limited by engagement of said margin and said neck.

* * * * *